United States Patent
Murase et al.

(10) Patent No.: US 7,139,483 B2
(45) Date of Patent: Nov. 21, 2006

(54) OPTICAL COMMUNICATION SYSTEM

(75) Inventors: Toru Murase, Osaka (JP); Masayuki Shigematsu, Yokohama (JP); Iwao Sasase, Yokohama (JP); Katsuhiro Kamakura, Chiba (JP)

(73) Assignees: Sumitomo Electric Industries, Ltd., Osaka (JP); Keio University, Tokyo (JP)

( * ) Notice: Subject to any disclaimer, the term of this patent is extended or adjusted under 35 U.S.C. 154(b) by 663 days.

(21) Appl. No.: 10/397,838

(22) Filed: Mar. 27, 2003

(65) Prior Publication Data

US 2004/0081461 A1 Apr. 29, 2004

(30) Foreign Application Priority Data

Mar. 29, 2002 (JP) ............... 2002-098083

(51) Int. Cl.
 *H04J 14/00* (2006.01)
 *H04B 10/00* (2006.01)
(52) U.S. Cl. .................. 398/72; 398/67; 398/169
(58) Field of Classification Search ........ 398/169, 398/170, 41, 67, 72
 See application file for complete search history.

(56) References Cited

U.S. PATENT DOCUMENTS 5,886,803 A * 3/1999 Yamamoto et al. ........... 398/41
6,011,637 A * 1/2000 Pfeiffer ........................ 398/1

FOREIGN PATENT DOCUMENTS

JP 10084322 3/1998
JP 2000196536 7/2000

OTHER PUBLICATIONS

"AWG-Based Incoherent Optical Division Multiple Access Networks" Fifth Optoelectronics and Communications (OECC 2000), Technical Digest, Jul. 2000, Makuhari Messe, pp. 452-453.

* cited by examiner

*Primary Examiner*—Jason Chan
*Assistant Examiner*—Shi K. Li
(74) *Attorney, Agent, or Firm*—McDermott Will & Emery LLP (57) ABSTRACT

An optical communication system is formed by connecting a base station to user stations. Each user station has a transmitting section for upstream communication. The base station has a light source which supplies transmission light used for upstream communication.

7 Claims, 6 Drawing Sheets

Input  Output

OPTICAL COMMUNICATION SYSTEM

BACKGROUND OF THE INVENTION

1. Field of the Invention

The present invention relates to an optical communication system based on a communication scheme using light and, more particularly, to an optical communication system to which code division multiple access is suitably applied.

2. Related Background Art

An optical communication system based on optical code division multiple access (to be referred to as an "optical CDMA system" hereinafter) is an optical communication system which shares one optical transmission line by coded optical signals from the respective users using spreading codes, thereby performing multiple access. This optical communication system uses light as a communication medium and is used for, for example, an optical communication system based on a passive optical network scheme (to be referred to as an "optical PON system" hereinafter). Assume that an optical CDMA system is to be applied to this optical PON system. In this case, when so-called upstream communication is to be performed, for example, information to be transmitted is primarily modulated into an optical signal first by the transmitting section of a terminal station used by a user. The primarily modulated optical signal is then secondarily modulated (to be referred to as "coded" hereinafter) on the basis of an assigned spreading code. The coded optical signal is transmitted to, for example, a base station used by a communication common carrier through a transmission line.

On the base station side, the coded optical signal is secondarily demodulated (to be referred to as "decoded" hereinafter) by a decoder corresponding to the spreading code. The succeeding optical detecting section primarily demodulates the decoded optical signal and determines the transmitted information. The determination result is received as the transmitted signal.

In this manner, in the optical CDMA system, an optical signal to be transmitted is coded by using a spreading code on the terminal station side, and the received optical signal is decoded by a correlator corresponding to the spreading code on the base station side, thereby performing optical communication.

SUMMARY OF THE INVENTION

In the above conventional optical communication system, since an optical signal is transmitted from a terminal station side to a base station side in upstream communication, a light source for supplying the optical signal is provided on the terminal station side. Since the terminal station is generally used by a user, it is troublesome for a carrier to perform maintenance. In addition, the terminal station is used by a user, and hence it is preferable to simplify an apparatus used in the terminal station as much as possible.

When a plurality of terminal stations are connected to a base station, since each terminal station has a light source, a large number of light sources are required.

It is, therefore, an object of the present invention to provide an optical communication system which facilitates the maintenance of light sources, simplifies an apparatus used in each terminal station, and does not require many light sources in performing upstream communication.

An optical communication system according to the present invention which solves the above problems comprises a light source which is provided in a light supply source provided separately from a terminal station and supplies transmission light for generating an optical signal to a transmitting section, a transmitting section which is provided in the terminal station, receives the transmission light supplied from the light supply source, generates an optical signal from the transmission light, and transmits the signal, a receiving section which is provided in a base station and receives the optical signal transmitted from the transmitting section, a first optical transmission line which connects the light source and the transmitting section and serves as a transmission line for the transmission light, and a second optical transmission line which connects the transmitting section and the receiving section and serves as a transmission line for the optical signal.

The light supply source is preferably provided in the base station.

Preferably, the terminal station comprises a plurality of terminal stations, a first optical coupler for distributing transmission light supplied from the light source to the plurality of terminal stations is provided on the first optical transmission line, and a second optical coupler for collecting optical signals transmitted from the plurality of terminal stations and transmitting the signals to the base station is provided on the second optical transmission line.

Preferably, the transmission light comprises multi-wavelength light having a plurality of different wavelengths that can be used for coding, the transmitting section in the terminal station has an optical modulator which generates an optically modulated optical signal by optically modulating the transmission light, and a coder which generates an optically modulated coded optical signal by coding the optically modulated optical signal using a predetermined code, the receiving section in the base station has a decoder which decodes the optically modulated coded optical signal, and the optically modulated coded optical signal is transmitted from the coder to the receiving section in the base station.

The terminal station preferably has a time adjuster which performs time adjustment for a transmission timing of the transmission light or the optically modulated coded optical signal.

When coders in a plurality of terminal stations are to use the same code sequence, the time adjuster preferably adjusts a relative time difference between transmission light beams supplied to the plurality of terminal stations such that an off-peak correlation value of the code sequence used in the plurality of terminal stations becomes 0.

The coder preferably codes the transmission light using a two-dimensional code.

Preferably, the transmission light comprises multi-wavelength light having a plurality of different wavelengths that can be used for coding, the light supply source has a coder which generates a coded optical signal by coding the transmission light generated by the light source using a predetermined code, and supplies the signal to the transmitting section in the terminal station, the transmitting section in the terminal station has an optical modulator which generates an optically modulated coded optical signal by optically modulating the coded optical signal, and a time adjuster which performs time adjustment for the optically modulated coded optical signal, and transmits the time-adjusted optically modulated coded optical signal to the receiving section in the base station, the receiving section in the base station has a decoder which decodes the optically modulated coded optical signal, and the optically modulated coded optical signal is transmitted from the time adjuster to the receiving section.

Preferably, the base station has a coder which generates a coded optical signal by coding, using a predetermined code, transmission light generated by the light source, and supplies the signal to the transmitting section in the terminal station, and a decoder which decodes an optical signal output through the second transmission line, the terminal station has a modulator which receives the coded optical signal, generates a coded optically modulated optical signal by optically modulating the signal, and outputs the signal to the decoder, and a time adjuster which adjusts an output timing of the coded optical signal or the coded optically modulated signal, and the coder codes the transmission light by using circularity in inputting the transmission light and cyclicity of a spreading code used in coding.

The coder and the decoder are preferably integrated.

The present invention will become more apparent from the following detailed description and the accompanying drawings. It should be noted that they are mere examples and do not limit the present invention.

The further application range of the present invention will become obvious from the following detailed description. Although the detailed description and specific cases indicate preferred embodiments of the present invention, they are mere examples. It is obvious that various modifications and improvements within the spirit and scope of the present invention are apparent to those skilled in the art from the detailed description.

DETAILED DESCRIPTION OF THE PREFERRED EMBODIMENTS

The preferred embodiments of the present invention will be described in detail below with reference to the accompanying drawings. For the sake of easy understanding of the following description, the same reference numerals denote the same constituent elements, wherever possible, throughout the drawings, and a repetitive description will be avoided.

Figure 1:
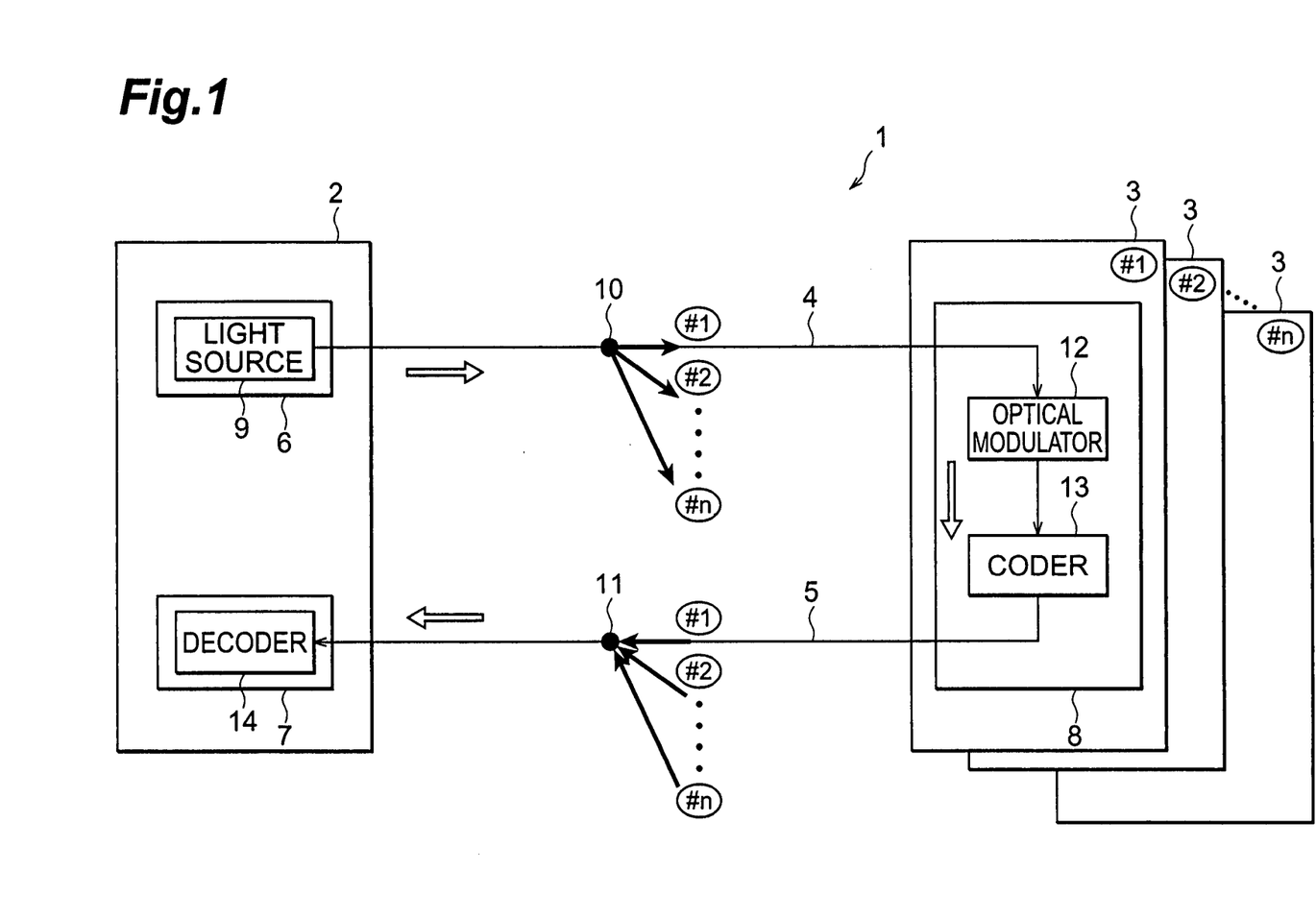
FIG. 1 is a block diagram showing the arrangement of an optical communication system according to the first embodiment of the present invention.

FIG. 1 is a block diagram showing the arrangement of an optical communication system according to the first embodiment of the present invention.

As shown in FIG. 1, an optical communication system 1 according to this embodiment forms a so-called optical CDMA system, in which a base station 2 and a plurality of (n in this embodiment) user stations 3 as terminal stations are connected to each other through a optical transmission line 4 and second optical transmission line 5. In the base station 2, a supply section 6 serving as a light supply source and a receiving section 7 are formed. FIG. 1 shows only the first user station 3. In each user station 3, a transmitting section 8 for upstream communication is formed. For example, the user of a terminal station can transmit predetermined information to the base station 2 through the transmitting section 8. Referring to FIG. 1, the flow of light is indicated by the outlined arrows.

The supply section 6 in the base station 2 has a light source 9, and outputs predetermined transmission light. The light source 9 outputs multi-wavelength or wavelength-multiplexed light obtained by multiplexing different wavelengths which can be used for coding. For example, a supercontinuum light source is used as the light source 9. For example, transmission light which can be used for coding can be light in a wavelength region between 1,500 nm to 1,600 nm, but can be properly determined depending on other conditions. Note that an LED light source, amplified spontaneous emission light source or the like can also be used as a light source.

The first optical transmission line 4 has a first optical coupler 10 formed from a star coupler. The first optical coupler 10 is connected to the light source 9 provided in the supply section 6 of the base station 2, and is also connected to the optical modulator 12 of the transmitting section 8 provided for each of first to nth user stations 3. Transmission light supplied from the light source 9 is distributed to the optical modulators 12 in the respective user stations 3.

In addition, the second optical transmission line 5 has a second optical coupler 11 formed from a star coupler. The second optical coupler 11 is connected to coders 13 provided in the transmitting sections 8 in the first to nth user stations 3, and is also connected to a decoder 14 provided in the receiving section 7 of the base station 2. The second optical coupler 11 collects coded optical signals output from the respective user station 3 and transmits them to the decoder 14 in the base station 2.

An optical modulator 12 provided in the transmitting section 8 of the user station 3 receives the transmission light output from the light source 9 through the first optical transmission line 4, and generates an optically modulated optical signal by primarily modulating transmission light into an optical signal on the basis of information properly set by the user of the user station 3. The generated optically modulated optical signal is transmitted to the coder 13. The coder 13 codes the optically modulated optical signal transmitted from the optical modulator 12 by using a properly assigned spreading code, thereby generating an optically modulated coded optical signal.

Figure 2:
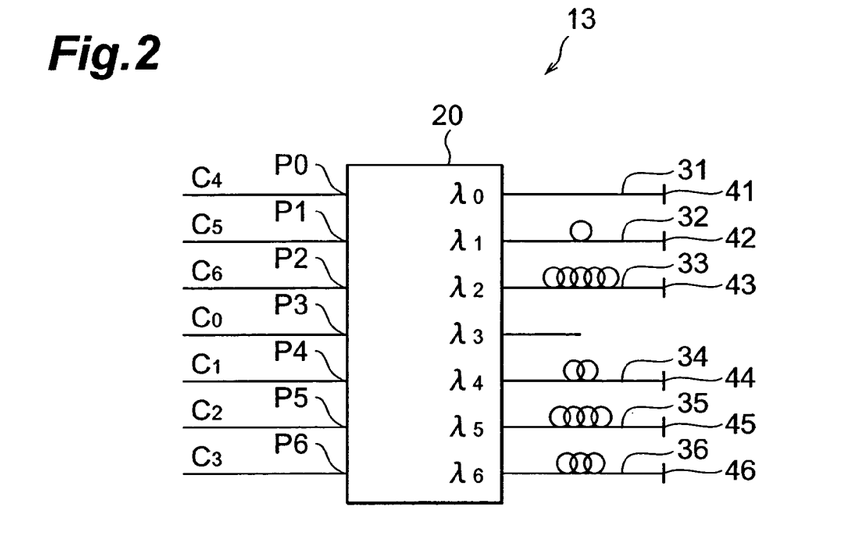
FIG. 2 is a view showing the schematic arrangement of a coder.
Figure 3:
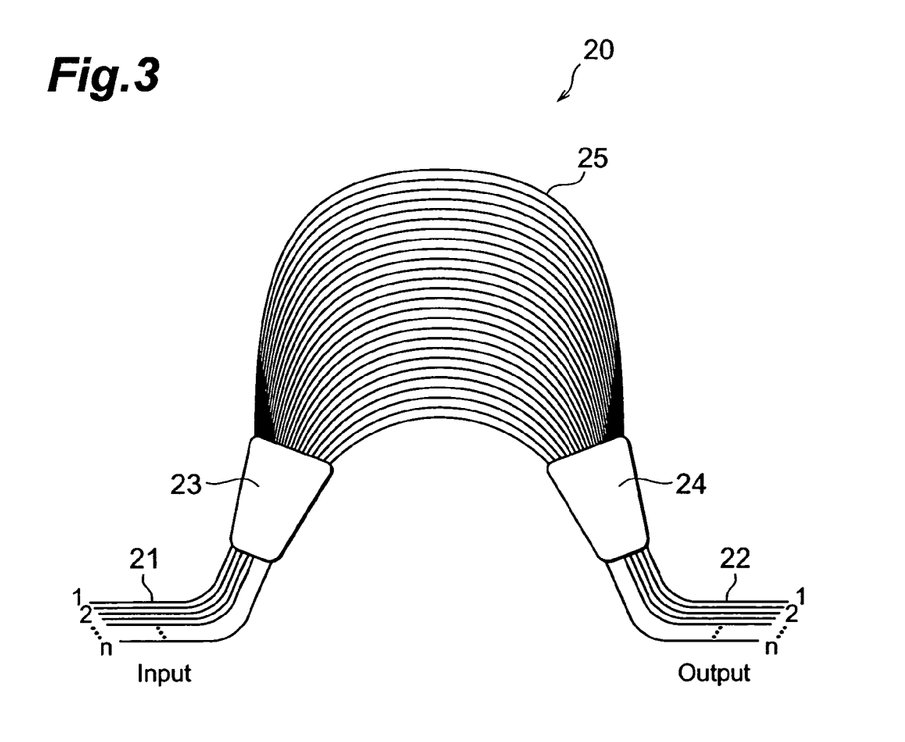
FIG. 3 is a view showing the schematic arrangement of an AWG.

As shown in FIG. 2, the coder 13 has an arrayed waveguide grating (to be referred to as an "AWG" hereinafter) 20. As shown in FIG. 3, the AWG 20 includes incident waveguides 21 and exit waveguides 22. The incident waveguides 21 are coupled by an incident-side slab waveguide 23. The exit waveguides 22 are coupled by an exit-side slab waveguide 24. Arrayed waveguides 25 are formed between the two slab waveguides 23 and 24.

When an optically modulated optical signal formed from multiple-wavelength light with a plurality of wavelengths is incident on the incident waveguides 21 of the AWG 20, the optical signal is diffracted and spread by the incident-side slab waveguide 23 and output to the arrayed waveguides 25.

Light beams having different wavelengths propagate through the arrayed waveguides 25. In this case, in the arrayed waveguides 25, the adjacent waveguides are arranged with predetermined optical path length differences, light beams which have propagated through the respective waveguides differ in phase by degrees corresponding to the optical path length differences. Since light beams having different wavelengths are now propagating through the arrayed waveguides 25, the light beams having different wavelengths are condensed at different positions in the exit waveguides 22. The exit waveguides 22 are placed at the respective positions corresponding to the different condensing positions. Therefore, light beams having different wavelengths emerge from the exit waveguides 22 on a wavelength basis. In this manner, an optically modulated optical signal formed from multiple-wavelength light with different wavelengths is demultiplexed for the respective different wavelengths.

As shown in FIG. 2, the incident waveguides 21 of the AWG 20 have seven ports P0 to P6. The exit waveguides 22 are connected to six optical delay lines 31 to 36. An optically modulated optical signal incident from a given portion of the AWG 20 is demultiplexed for the respective different wavelengths by the AWG 20. Each light beam is then output to a corresponding one of the optical delay lines 31 to 36 depending on the wavelength. The optical delay lines 31 to 36 respectively have different numbers of delay loops. More specifically, the first optical delay line 31 has no delay loop. The second optical delay line 32 has one delay loop. The third optical delay line 33 has five delay loops. The fourth optical delay line 34 has two delay loops. The fifth optical delay line 35 has four delay loops. The sixth optical delay line 36 has three delay loops. In addition, reflectors 41 to 46 are provided at the end portions of the optical delay lines 31 to 36.

The light beams output from the exit waveguides 22 of the AWG 20 and guided to the optical delay lines 31 to 36 are reflected by the reflectors 41 to 46, respectively, and return to the AWG 20 and the respective ports P0 to P6. In this case, since the respective optical delay lines 31 to 36 have different numbers of delay loops, the light beams having different wavelengths, output from the exit waveguides 22, return to the AWG 20 with the respective time differences. Each light beam then emerges from a corresponding one of the ports P0 to P6. In this manner, light beams having different wavelengths are output with time differences to code the optically modulated optical signal, thereby generating an optically modulated coded optical signal.

More specifically, consider a case wherein the chip count of an optically modulated optical signal is six, and seven wavelengths are used. Assume that an optically modulated optical signal is input from the port P3, light beams with wavelengths $\lambda 0$ to $\lambda 2$ are output to the optical delay lines 31 to 33, and light beams with wavelengths $\lambda 4$ to $\lambda 6$ are output to the optical delay lines 34 to 36. In this case, a code C0 output from the port P3 has the wavelengths $\lambda 0$, $\lambda 1$, $\lambda 4$, $\lambda 6$, $\lambda 5$, and $\lambda 2$ arranged in the order named, with the wavelength $\lambda 3$ being eliminated. The following table shows the relationship between codes C0 to C6 and the orders of wavelengths when the codes are input from the respective ports. As shown in Table 1, for example, in the code C1, the wavelengths $\lambda 1$, $\lambda 2$, $\lambda 5$, $\lambda 0$, $\lambda 6$, and $\lambda 3$ are arranged in the order named. In this manner, seven types of optically modulated coded optical signals, i.e., the codes C0 to C6 are generated.

TABLE 1

| | Chip # | | | | | |
| --- | --- | --- | --- | --- | --- | --- |
| | 1 | 2 | 3 | 4 | 5 | 6 |
| C0 | 0 | 1 | 4 | 6 | 5 | 2 |
| C1 | 1 | 2 | 5 | 0 | 6 | 3 |
| C2 | 2 | 3 | 6 | 1 | 0 | 4 |
| C3 | 3 | 4 | 0 | 2 | 1 | 5 |
| C4 | 4 | 5 | 1 | 3 | 2 | 6 |
| C5 | 5 | 6 | 2 | 4 | 3 | 0 |
| C6 | 6 | 0 | 3 | 5 | 4 | 1 |

Transmission light is supplied to the AWG 20 in the coder 13. At this time, the transmission light is supplied while circulating through the respective ports P0 to P6. Spreading codes used for coding have cyclicity. By using the circularity of transmission light supplied to the AWG 20 and the cyclicity of spreading codes, the number of light wavelengths and the number of chips can be decreased. Since there is no need to use different code sequences by the number equal to the number of terminal stations, the number of terminal stations can be increased without increasing the number of light wavelengths and the number of chips.

The optically modulated coded optical signal generated by the coder 13 in this manner is transmitted to the second optical coupler 11 through the second optical transmission line 5. The optically modulated coded optical signals coded in the same manner as described above are transmitted from the second to nth user stations 3 as well as the first user station 3 to the second optical coupler 11. Note that the coders 13 of the second to nth user stations use codes different from the code used by the coder 13 in the first user station 3.

The second optical coupler 11 collects these optically modulated coded optical signals and outputs them to the decoder 14 provided in the receiving section 7. The decoder 14 decodes each optically modulated coded optical signal output from the second optical coupler 11. The decoded optical signal is output to a detecting section (not shown). The optical detecting section then primarily demodulates the decoded optical signal and determines the transmitted information. In this manner, the determination result is received as the transmitted signal.

As described above, the optical communication system 1 according to this embodiment is designed to perform transmission of a signal from the user station 3 to the base station 2, i.e., so-called upstream transmission, and allows the construction of a CDMA system without providing any light source in the user station 3. The transmitting section on the user station side can therefore be simplified. In addition, in maintaining, for example, the light source 9, since the base station 2 is generally a communication common carrier, a maintenance person generally need not visit the user station 3 used by the user. This facilitates the maintenance of the light source.

In addition, in spite of the plurality of user stations 3, only one light source 9 in the base station 2 is required. Compared with a case wherein light sources are provided for the respective users, therefore, the number of light sources can be greatly decreased. This makes it possible to greatly decrease the number of light sources in the overall system.

The second embodiment of the present invention will be described next.

Figure 4:
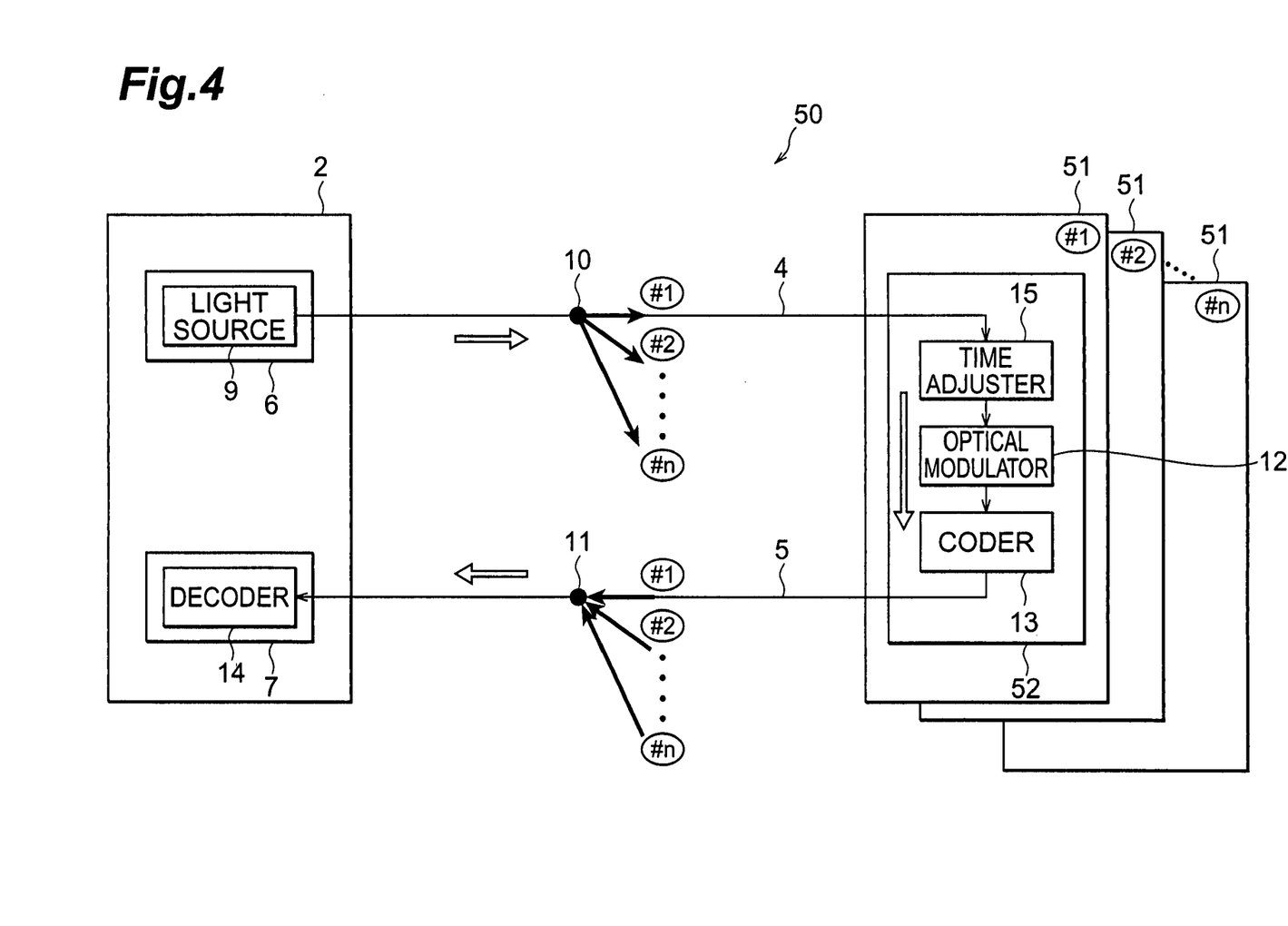
FIG. 4 is a block diagram showing the arrangement of an optical communication system according to the second embodiment of the present invention.

FIG. 4 is a block diagram showing the arrangement of an optical communication system according to the second embodiment of the present invention.

As shown in FIG. 4, an optical communication system 50 according to this embodiment differs from the system according to the first embodiment in the arrangement of a user station 51. The optical communication system 50 according to this embodiment has a plurality of user stations 51 as in the first embodiment. However, each user station 51 has a transmitting section 52. The transmitting section 52 has an optical modulator 12 and coder 13 as in the first embodiment, and also includes a time adjuster 15. The time adjuster 15 is provided between a first optical coupler 10 and an optical modulator 12. Transmission light dispersed by the first optical coupler 10 is supplied to the time adjuster 15 through an optical transmission line 4. The time adjuster 15 adjusts a delay time by adjusting the length of an optical fiber. The time adjuster 15 adjusts the timing of supplying transmission light. This adjusts the output timing of an optically modulated coded optical signal to be supplied to a decoder 14 provided in a base station 2. Therefore, the time adjuster 15, which is provided between the first optical transmission line 4 and the coder 13 in this embodiment, can be provided between, for example, the coder 13 and a second optical transmission line 5. The second embodiment has the same arrangement as that of the first embodiment except for this. As in the first embodiment, the flow of light is indicated by the outlined arrows.

In the optical communication system 50 according to this embodiment, the timing of supplying transmission light to the optical modulator 12 and to the coder 13 can be adjusted by the time adjuster 15. The time adjuster 15 shifts the optical signal supply timing between the user stations 51 by a chip time. For this reason, even if signals are coded by using the same code sequence in the different user stations 51, the coded signals from the respective user stations 51 can be identified by making a receiving section 7 detect chip time differences.

Figure 5:
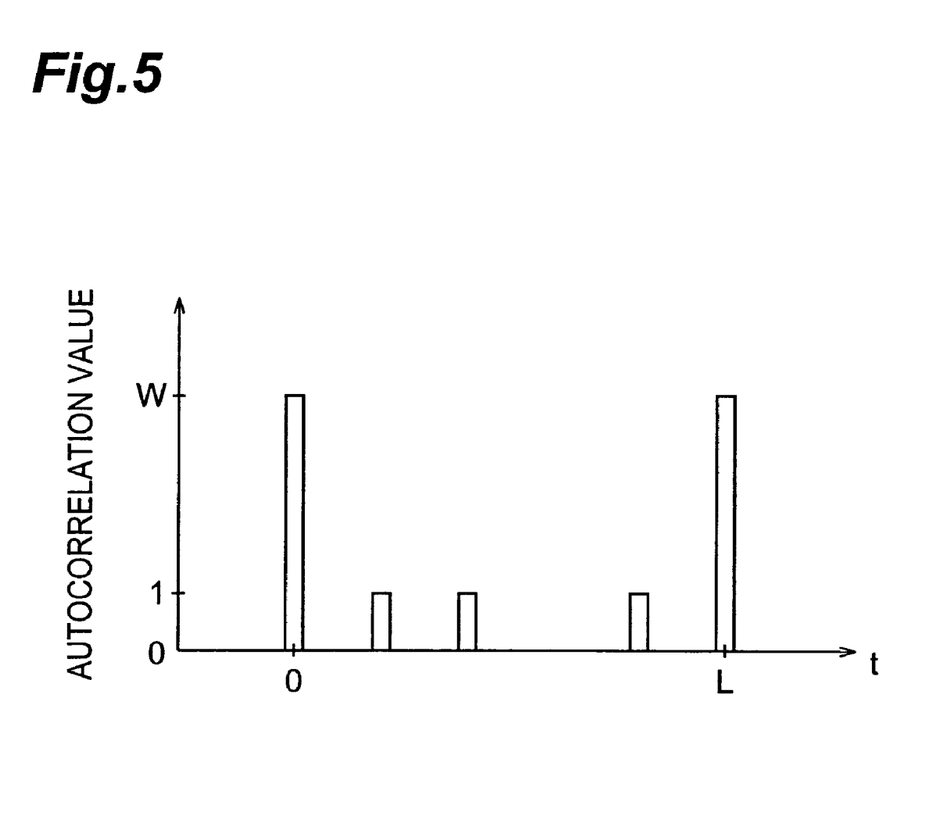
FIG. 5 is a graph showing the relationship between the autocorrelation value and the time in a coder.

In this case, when the supply times to the user stations 51 are to be shifted by the time adjuster 15, it is preferable to adjust the relative time differences between the user stations 51 using the same code sequence such that the off-peak correlation value becomes 0. Assume that in such a form, the first and second user stations 51 use the same code sequence. Consider an autocorrelation value in the first user station 51. As shown in FIG. 5, there are several chip times corresponding to an autocorrelation value of 1 throughout a code length L with W representing an autocorrelation value weight. On the other hand, there is a time corresponding to an autocorrelation value of 0 in addition to the times corresponding to an autocorrelation value of 1. The time adjuster 15 shifts the supply timings of transmission light beams from the first and second user stations 51 such that the autocorrelation value of the code sequence in the second user station 51 becomes W when this autocorrelation value becomes 0. In this manner, the off-peak correlation value of the code sequence between the first and second user stations 51 can be set to 0.

By setting the off-peak correlation value of the code sequence between the first and second user stations 51, which use the same code sequence, to 0 in this manner, optical signals from the user stations 51 are orthogonally transmitted. This makes it possible to perform optical communication between a plurality of user stations 51 and the base station 2 without being affected by multiple access interferences.

Third embodiment of the present invention will be described next.

Figure 6:
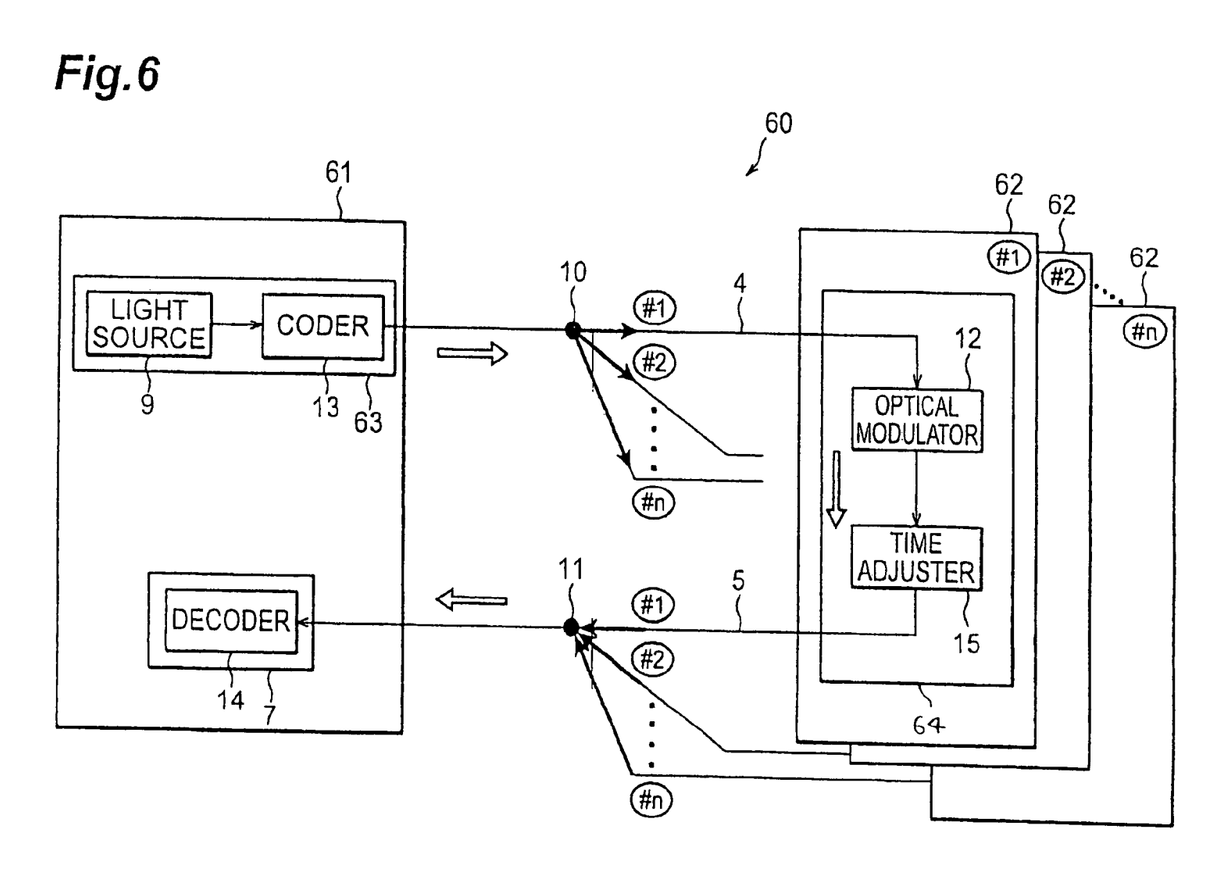
FIG. 6 is a block diagram showing the arrangement of an optical communication system according to the third embodiment of the present invention.

FIG. 6 is a block diagram showing the arrangement of an optical communication system according to the third embodiment of the present invention.

As shown in FIG. 6, an optical communication system 60 according to this embodiment differs from the system according to the first embodiment in the arrangements of a base station and user station. A base station 61 in this embodiment has a supply section 63 in addition to a receiving section 7 similar to the one in the first embodiment. This system has a plurality of user stations 62 as in the first embodiment. However, each user station 62 has a transmitting section 64 different from the one in the first embodiment. The transmitting section 64 provided in the user station 62 has an optical modulator 12 and time adjuster 15. The optical modulator 12 and time adjuster 15 have the same arrangements as those of the equivalents used in the first and second embodiments. Although the time adjuster 15 is provided between the optical modulator 12 and a second optical transmission line 5, the adjuster 15 may be provided between a first optical transmission line 4 and the optical modulator 12. As in each embodiment described above, the flow of light is indicated by the outlined arrows.

The supply section 63 provided in the base station 61 has a light source 9 and coder 13. The transmission light emitted from the light source 9 is supplied to the coder 13. The coder 13 generates a coded optical signal by coding the transmission light supplied from the light source 9. If, for example, the transmission light supplied from the light source 9 is caused to branch off to be simultaneously input to a plurality of input ports P0 to P6 (see FIG. 2) of the coder 13, many coded optical signals can be generated by using one light source 9 and one coder 13. The coded optical signal generated by the coder 13 is transmitted to a first optical coupler 10 through the first optical transmission line 4. The first optical coupler 10 transmits the transmitted coded optical signal to the optical modulator 12 of the transmitting section 64 in each of first to nth user stations 62.

The optical modulator 12 primarily modulates the coded optical signal on the basis of information properly set by the user of the user station 62. By primarily modulating the coded optical signal obtained by coding the transmission light, a coded optically modulated optical signal is generated. This coded optically modulated optical signal is transmitted to a decoder 14 provided in the receiving section 7 in the base station 61. Since the remaining user stations 62 output signals using the same code sequence, if the above signal is transmitted without any processing, the signal cannot be discriminated from the signals from the remaining user stations. In consideration of this point, this embodiment has the time adjuster 15 provided in the transmitting section 64 in the user station 62. With the time adjuster 15, as in the second embodiment, the optical signal supply timings can be shifted by a chip time among the user stations 62. The receiving section detects this chip time difference to identify signals from the user stations 62.

In this manner, the optical communication system 60 according to this embodiment can use the same code sequence among a plurality of user stations, and no coder need be provided in any user station. The number of coders can be greatly decreased in the optical communication system 60 as a whole. In addition, since a coder is provided in a base station, the communication common carrier need not visit each user station for maintenance of a coder.

The fourth embodiment of the present invention will be further described below.

Figure 7:
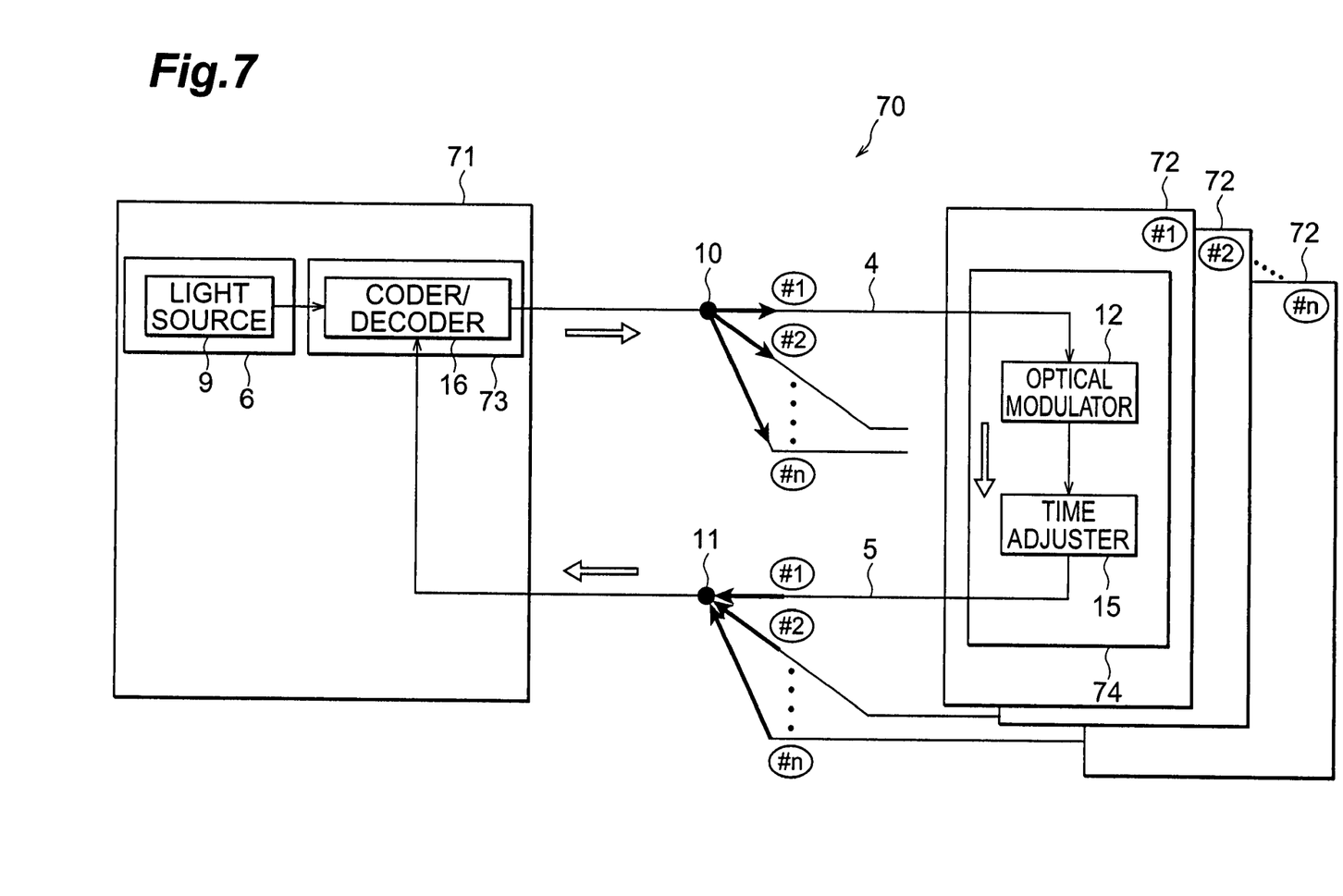
FIG. 7 is a block diagram showing the arrangement of an optical communication system according to the fourth embodiment of the present invention.

FIG. 7 is a block diagram showing the arrangement of an optical communication system according to the fourth embodiment of the present invention.

As shown in FIG. 7, an optical communication system 70 according to this embodiment differs from the system according to the first embodiment in the arrangements of a base station and user station. A base station 71 in the optical communication system 70 according to this embodiment has a receiving section 73 in addition to a supply section 6 similar to the one in the first embodiment. The receiving section 73 has a coder/decoder 16 for coding and decoding signals. A user station 72 has a transmitting section 74. The transmitting section 74 has the same arrangement as that in the third embodiment. The transmitting section 74 has an optical modulator 12 and time adjuster 15. The fourth embodiment has the same arrangement as that of the first embodiment except for the above arrangement. Although the time adjuster 15 is provided between a first optical transmission line 4 and the optical modulator 12, the adjuster 15 may be provided between the time adjuster 15 and a second optical transmission line 5. In addition, as in each embodiment described above, the flow of light is indicated by the outlined arrows.

In the optical communication system 70 according to this embodiment, the base station 71 has the coder/decoder 16. The use of the coder/decoder 16 formed by integrating a coder and decoder can simplify the apparatus arrangement on the base station side as compared with the third embodiment, and can also simplify the apparatus arrangement of the optical communication system 70 as a whole.

The predetermined embodiments of the present invention have been described above. However, the present invention is not limited to the above embodiments. For example, in each embodiment described above, a light source is provided in a base station. However, for example, a light supply source may be independently set, and a light source may be provided in the light supply source. In this case as well, since the light supply source is managed by a communication common carrier, the ease maintenance can be ensured. If there are a plurality of terminal stations, the number of light sources can be decreased. If there are a plurality of terminal stations, a light supply source can be provided in a given terminal station. Furthermore, if there are many terminal stations, a plurality of light supply sources may be set, instead of one light supply source, and each light supply source may supply transmission light to a predetermined number of terminal stations.

In the above embodiment, if transmission light supplied from a light source for supplying light having many wavelengths, e.g., a light source having wavelengths larger in number than the input/output ports of a coder, is caused to branch off to be simultaneously input to a plurality of input ports of the coder, optical communication can be done with more terminal stations by using one light source and one decoder. More specifically, if a light source transmits light having wavelengths of λ0 to λ100 and the coder has seven ports, λ0 to λ6, λ7 to λ13, and λ14 to λ20 are simultaneously coded. If this coded signal is demultiplexed and supplied, coded signals can be simultaneously supplied to more terminal stations.

Each embodiment described above has exemplified the optical CDMA system as an optical communication system. However, the present invention can also be applied to other optical communication systems. In this case, coding operation using both a wavelength region and a time region has been described. However, coding operation using only a time region or a wavelength region may be used.

What is claimed is:

1. An optical communication system comprising:
a light source which is provided in a light supply source provided separately from a terminal station and supplies transmission light for generating an optical signal to a transmitting section;
a transmitting section which is provided in the terminal station, which receives the transmission light supplied from the light supply source, generates an optical signal from the transmission light, and transmits the signal;
a receiving section which is provided in a base station and receives the optical signal transmitted from said transmitting section;
a first optical transmission line which connects said light source and said transmitting section and serves as a transmission line for the transmission light; and
a second optical transmission line which connects said transmitting section and said receiving section and serves as a transmission line for the optical signal, wherein
the transmission light comprises multi-wavelength light having a plurality of different wavelengths that can be used for coding,
said transmitting section in the terminal station has an optical modulator which generates an optically modulated optical signal by optically modulating the transmission light, and a coder which generates an optically modulated coded optical signal by coding the optically modulated optical signal using a predetermined code,
said receiving section in the base station has a decoder which decodes the optically modulated coded optical signal,
the optically modulated coded optical signal is transmitted from the coder to said receiving section in the base station,
the terminal station has a time adjuster which performs time adjustment for a transmission timing of the transmission light or the optically modulated coded optical signal, and
when coders in a plurality of terminal stations are to use the same code sequence, the time adjuster adjusts a relative time difference between transmission light beams supplied to said plurality of terminal stations such that an off-peak correlation value of the code sequence used in said plurality of terminal stations becomes 0.

2. A system according to claim 1, wherein the coder codes the transmission light using a two-dimensional code.

3. An optical communication system comprising:
a light source which is provided in a light supply source provided separately from a terminal station and supplies transmission light for generating an optical signal to a transmitting section;
a transmitting section which is provided in the terminal station, which receives the transmission light supplied from the light supply source, generates an optical signal from the transmission light, and transmits the signal;
a receiving section which is provided in a base station and receives the optical signal transmitted from said transmitting section;
a first optical transmission line which connects said light source and said transmitting section and serves as a transmission line for the transmission light; and
a second optical transmission line which connects said transmitting section and said receiving section and serves as a transmission line for the optical signal, wherein the terminal station comprises a plurality of terminal stations, a first optical coupler for distributing transmission light supplied from said light source to said plurality of terminal stations is provided on said first optical transmission line, a second optical coupler for collecting optical signals transmitted from said plurality of terminal stations and transmitting the signals to the base station is provided on said second optical transmission line, the transmission light comprises multi-wavelength light having a plurality of different wavelengths that can be used for coding, said transmitting section in the terminal station has an optical modulator which generates an optically modulated optical signal by optically modulating the transmission light, and a coder which generates an optically modulated coded optical signal by coding the optically modulated optical signal using a predetermined code, said receiving section in the base station has a decoder which decodes the optically modulated coded optical signal, the terminal station has a time adjuster which performs time adjustment for a transmission timing of the transmission light or the optically modulated coded optical signal, and when coders in a plurality of terminal stations are to use the same code sequence, the time adjuster adjusts a relative time difference between transmission light beams supplied to said plurality of terminal stations such that an off-peak correlation value of the code sequence used in said plurality of terminal stations becomes 0.

4. A system according to claim 3, wherein the coder codes the transmission light using a two-dimensional code.

5. An optical communication system comprising:

a light source which is provided in a light supply source provided separately from a terminal station and supplies transmission light for generating an optical signal to a transmitting section;

a transmitting section which is provided in the terminal station, which receives the transmission light supplied from the light supply source, generates an optical signal from the transmission light, and transmits the signal;

a receiving section which is provided in a base station and receives the optical signal transmitted from said transmitting section; a first optical transmission line which connects said light source and said transmitting section and serves as a transmission line for the transmission light; and a second optical transmission line which connects said transmitting section and said receiving section and serves as a transmission line for the optical signal, wherein the transmission light comprises multi-wavelength light having a plurality of different wavelengths that can be used for coding, the light supply source has a coder which generates a coded optical signal by coding the transmission light generated by said light source using a predetermined code, and supplies the signal to said transmitting section in the terminal station, said transmitting section in the terminal station has an optical modulator which generates an optically modulated coded optical signal by optically modulating the coded optical signal, and a time adjuster which performs time adjustment for the optically modulated coded optical signal, and transmits the time-adjusted optically modulated coded optical signal to said receiving section in the base station, said receiving section in the base station has a decoder which decodes the optically modulated coded optical signal, and the optically modulated coded optical signal is transmitted from the time adjuster to said receiving section.

6. An optical communication system comprising:

a light source which is provided in a light supply source provided separately from a terminal station and supplies transmission light for generating an optical signal to a transmitting section;

a transmitting section which is provided in the terminal station, which receives the transmission light supplied from the light supply source, generates an optical signal from the transmission light, and transmits the signal;

a receiving section which is provided in a base station and receives the optical signal transmitted from said transmitting section;

a first optical transmission line which connects said light source and said transmitting section and serves as a transmission line for the transmission light; and a second optical transmission line which connects said transmitting section and said receiving section and serves as a transmission line for the optical signal, wherein the terminal station comprises a plurality of terminal stations, a first optical coupler for distributing transmission light supplied from said light source to said plurality of terminal stations is provided on said first optical transmission line, a second optical coupler for collecting optical signals transmitted from said plurality of terminal stations and transmitting the signals to the base station is provided on said second optical transmission line, the transmission light comprises multi-wavelength light having a plurality of different wavelengths that can be used for coding, the light supply source has a coder which generates a coded optical signal by coding the transmission light generated by said light source using a predetermined code, and supplies the signal to said transmitting section in the terminal station, said transmitting section in the terminal station has an optical modulator which generates an optically modulated coded optical signal by optically modulating the coded optical signal, and a time adjuster which performs time adjustment for the optically modulated coded optical signal, and transmits the time-adjusted optically modulated coded optical signal to said receiving section in the base station, said receiving section in the base station has a decoder which decodes the optically modulated coded optical signal, and the optically modulated coded optical signal is transmitted from the time adjuster to said receiving section.

7. A system according to claim 6, wherein the coder and the decoder are integrated.

* * * * *